(12) United States Patent
Kogelnik

(10) Patent No.: US 8,898,536 B2
(45) Date of Patent: Nov. 25, 2014

(54) MULTI-CORE ENGINE FOR DETECTING BIT ERRORS

(75) Inventor: Christoph Kogelnik, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1814 days.

(21) Appl. No.: 11/741,016

(22) Filed: Apr. 27, 2007

(65) Prior Publication Data

US 2009/0327818 A1 Dec. 31, 2009

(51) Int. Cl.
*H03M 13/00* (2006.01)
*G06F 21/60* (2013.01)
*G06F 11/10* (2006.01)
*H04L 29/06* (2006.01)
*H03M 13/09* (2006.01)

(52) U.S. Cl.
CPC .......... *G06F 21/602* (2013.01); *G06F 11/1004* (2013.01); *G06F 2221/2107* (2013.01); *H04L 63/0428* (2013.01); *H04L 2463/062* (2013.01); *H03M 13/09* (2013.01)
USPC .......................................... 714/758; 714/763

(58) Field of Classification Search
USPC ................................. 714/758, 763
See application file for complete search history.

(56) References Cited

U.S. PATENT DOCUMENTS

| 3,876,978 | A | | 4/1975 | Bossen et al. |
|---|---|---|---|---|
| 4,092,732 | A | | 5/1978 | Ouchi |
| 4,201,976 | A | | 5/1980 | Patel |
| 4,205,324 | A | | 5/1980 | Patel |
| 4,365,332 | A | * | 12/1982 | Rice ............................. 714/746 |
| 4,375,100 | A | | 2/1983 | Tsuji et al. |
| 4,467,421 | A | | 8/1984 | White |
| 4,517,663 | A | | 5/1985 | Imazeki et al. |
| 4,667,326 | A | | 5/1987 | Young et al. |
| 4,688,221 | A | | 8/1987 | Nakamura et al. |
| 4,722,085 | A | | 1/1988 | Flora et al. |
| 4,755,978 | A | | 7/1988 | Takizawa et al. |
| 4,761,785 | A | | 8/1988 | Clark et al. |
| 4,775,978 | A | | 10/1988 | Hartness |
| 4,796,260 | A | | 1/1989 | Schilling et al. |
| 4,817,035 | A | | 3/1989 | Timsit |
| 4,825,403 | A | | 4/1989 | Gershenson et al. |
| 4,837,680 | A | | 6/1989 | Crockett et al. |
| 4,847,842 | A | | 7/1989 | Schilling |
| 4,849,929 | A | | 7/1989 | Timsit |

(Continued)

OTHER PUBLICATIONS

High Performance Voting for Data Encription Standard Engine Data Integrity and Reliability, IBM Technical Disclosure Bulletin, Nov. 1, 1993, vol. 36, Issue #11, pp. 189-192.*

(Continued)

*Primary Examiner* — Joseph D Torres
(74) *Attorney, Agent, or Firm* — Cesari and McKenna, LLP

(57) ABSTRACT

The following description includes a method and a system of detecting bit errors in a multi-core processor. When a subatomic particle, or other matter, impacts the processing cores of the processor, bit flips may occur. To detect these bit flips and thereby prevent erroneous results, operations performed by one core are inversely performed by another core. By comparing the results of the original operation and the inverse operation, embodiments of the invention can detect errors in binary data. If an error is detected, then the operations are performed again. Alternatively, multiple cores do not perform inverse operations, but instead perform identical operations in parallel. The results from the parallel operations are compared and if the results are not identical, then the operations are repeated.

29 Claims, 8 Drawing Sheets

(56) References Cited

U.S. PATENT DOCUMENTS

| | | | | |
|---|---|---|---|---|
| 4,849,974 | A | 7/1989 | Schilling et al. | |
| 4,849,976 | A | 7/1989 | Schilling et al. | |
| 4,870,643 | A | 9/1989 | Bultman et al. | |
| 4,899,342 | A | 2/1990 | Potter et al. | |
| 4,989,205 | A | 1/1991 | Dunphy, Jr. et al. | |
| 4,989,206 | A | 1/1991 | Dunphy, Jr. et al. | |
| 5,022,080 | A * | 6/1991 | Durst et al. | 713/178 |
| 5,077,736 | A | 12/1991 | Dunphy, Jr. et al. | |
| 5,088,081 | A | 2/1992 | Farr | |
| 5,101,492 | A | 3/1992 | Schultz et al. | |
| 5,128,810 | A | 7/1992 | Halford | |
| 5,148,432 | A | 9/1992 | Gordon et al. | |
| RE34,100 | E | 10/1992 | Hartness | |
| 5,163,131 | A | 11/1992 | Row et al. | |
| 5,166,936 | A | 11/1992 | Ewert et al. | |
| 5,179,704 | A | 1/1993 | Jibbe et al. | |
| 5,200,999 | A * | 4/1993 | Matyas et al. | 380/277 |
| 5,202,979 | A | 4/1993 | Hillis et al. | |
| 5,208,813 | A | 5/1993 | Stallmo | |
| 5,210,860 | A | 5/1993 | Pfeffer et al. | |
| 5,218,689 | A | 6/1993 | Hotle | |
| 5,233,618 | A | 8/1993 | Glider et al. | |
| 5,235,601 | A | 8/1993 | Stallmo et al. | |
| 5,237,658 | A | 8/1993 | Walker et al. | |
| 5,257,367 | A | 10/1993 | Goodlander et al. | |
| 5,274,799 | A | 12/1993 | Brant et al. | |
| 5,305,326 | A | 4/1994 | Solomon et al. | |
| 5,313,626 | A | 5/1994 | Jones et al. | |
| 5,319,710 | A * | 6/1994 | Atalla et al. | 705/75 |
| 5,351,246 | A | 9/1994 | Blaum et al. | |
| 5,355,453 | A | 10/1994 | Row et al. | |
| 5,398,283 | A * | 3/1995 | Virga | 380/243 |
| 5,410,667 | A | 4/1995 | Belsan et al. | |
| 5,485,579 | A | 1/1996 | Hitz et al. | |
| 5,537,567 | A | 7/1996 | Galbraith et al. | |
| 5,579,475 | A | 11/1996 | Blaum et al. | |
| 5,623,595 | A | 4/1997 | Bailey | |
| 5,778,206 | A * | 7/1998 | Pain et al. | 710/305 |
| 5,802,366 | A | 9/1998 | Row et al. | |
| 5,805,788 | A | 9/1998 | Johnson | |
| 5,812,753 | A | 9/1998 | Chiariotti | |
| 5,819,292 | A | 10/1998 | Hitz et al. | |
| 5,852,664 | A * | 12/1998 | Iverson et al. | 705/51 |
| 5,862,158 | A | 1/1999 | Baylor et al. | |
| 5,884,098 | A | 3/1999 | Mason, Jr. | |
| 5,918,001 | A | 6/1999 | Ueno et al. | |
| 5,931,918 | A | 8/1999 | Row et al. | |
| 5,941,972 | A | 8/1999 | Hoese et al. | |
| 5,963,962 | A | 10/1999 | Hitz et al. | |
| 5,974,544 | A | 10/1999 | Jeffries et al. | |
| 6,012,839 | A * | 1/2000 | Nguyen et al. | 714/755 |
| 6,032,253 | A * | 2/2000 | Cashman et al. | 712/300 |
| 6,038,570 | A | 3/2000 | Hitz et al. | |
| 6,065,027 | A * | 5/2000 | Cashman et al. | 708/203 |
| 6,065,037 | A | 5/2000 | Hitz et al. | |
| 6,092,215 | A | 7/2000 | Hodges et al. | |
| 6,138,125 | A | 10/2000 | DeMoss | |
| 6,138,201 | A | 10/2000 | Rebalski | |
| 6,157,955 | A * | 12/2000 | Narad et al. | 709/228 |
| 6,158,017 | A | 12/2000 | Han et al. | |
| 6,172,990 | B1 * | 1/2001 | Deb et al. | 370/474 |
| 6,175,915 | B1 * | 1/2001 | Cashman et al. | 712/227 |
| 6,192,491 | B1 * | 2/2001 | Cashman et al. | 714/52 |
| 6,205,487 | B1 * | 3/2001 | Cashman et al. | 709/236 |
| 6,209,087 | B1 * | 3/2001 | Cashman et al. | 712/300 |
| 6,212,569 | B1 * | 4/2001 | Cashman et al. | 709/236 |
| 6,223,300 | B1 | 4/2001 | Gotoh | |
| 6,233,108 | B1 | 5/2001 | Inoue | |
| 6,282,670 | B1 | 8/2001 | Rezaul Islam et al. | |
| 6,356,999 | B1 * | 3/2002 | Cashman et al. | 712/209 |
| 6,425,035 | B2 | 7/2002 | Hoese et al. | |
| 6,434,711 | B1 | 8/2002 | Takiyanagi | |
| 6,438,678 | B1 * | 8/2002 | Cashman et al. | 712/34 |
| 6,442,711 | B1 | 8/2002 | Sasamoto et al. | |
| 6,467,060 | B1 * | 10/2002 | Malakapalli et al. | 714/758 |
| 6,519,733 | B1 * | 2/2003 | Har et al. | 714/758 |
| 6,532,548 | B1 | 3/2003 | Hughes | |
| 6,581,185 | B1 | 6/2003 | Hughes | |
| 6,654,889 | B1 * | 11/2003 | Trimberger | 713/191 |
| 6,854,071 | B2 | 2/2005 | King et al. | |
| 6,920,154 | B1 * | 7/2005 | Achler | 370/477 |
| 6,950,966 | B2 | 9/2005 | Chiquoine et al. | |
| 6,993,701 | B2 | 1/2006 | Corbett et al. | |
| 7,020,160 | B1 * | 3/2006 | Achler | 370/466 |
| 7,055,057 | B2 | 5/2006 | Achiwa | |
| 7,089,391 | B2 * | 8/2006 | Geiger et al. | 711/170 |
| 7,180,909 | B1 * | 2/2007 | Achler | 370/466 |
| 7,324,547 | B1 * | 1/2008 | Alfieri et al. | 370/461 |
| 7,362,772 | B1 * | 4/2008 | Alfieri et al. | 370/429 |
| RE40,405 | E * | 6/2008 | Schwartz et al. | 713/187 |
| 7,397,797 | B2 * | 7/2008 | Alfieri et al. | 370/392 |
| 7,529,885 | B2 * | 5/2009 | Kimura et al. | 711/113 |
| 7,546,469 | B2 * | 6/2009 | Suzuki et al. | 713/176 |
| 2002/0048364 | A1 * | 4/2002 | Gligor et al. | 380/37 |
| 2006/0039465 | A1 * | 2/2006 | Emerson et al. | 375/240.01 |

OTHER PUBLICATIONS

Bultman, David L., High Performance SCSI Using Parallel Drive Technology, In Proc. BUSCON Conf., pp. 40-44, Anaheim, CA, Feb. 1988.

Gibson, Garth A., et al., Coding Techniques for Handling Failures in Large Disk Arrays, Technical Report UCB/CSD 88/477, Computer Science Division, University of California, Jul. 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al.., Strategic Directions in Storage I/O Issues in Large-Scale Computing, ACM Computing Survey, 28(4):779-93, Dec. 1996.

Hitz, Dave et al., File System Design for an NFS File Server Appliance, Technical Report 3002, Rev. C395, presented Jan. 19, 1994, 23 pages.

Katz, Randy H. et al., Disk System Architectures for High Performance Computing, Proceedings of the IEEE, vol. 77, No. 12, pp. 1842-1858, Dec. 1989.

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

* cited by examiner

MULTI-CORE ENGINE FOR DETECTING BIT ERRORS

BACKGROUND

Subatomic particles, such as alpha particles and neutrons, regularly bombard the Earth's atmosphere. Such particles can impact electronic devices that include semiconductors. For example, an electronic device may be a flight computer on an aircraft, a Global Positioning System (GPS) device used in a mountain wilderness, or a trip computer in an automobile. These devices typically include semiconductors that may be detrimentally affected by the particles.

For example, a semiconductor, which is used to produce a central processing unit (CPU), may be affected by these particles. The CPU, also known as a processor, manipulates binary information called bits. The manipulation, or processing of binary information includes computations, such as addition or multiplication. During such a computation, particles impacting the processor may flip a bit. For example, a "0" may flip to a "1" and vice versa. Such bit flips cause erroneous results. These erroneous results may be benign, such as a bit flip causing a pixel on a computer display to be a darker than it should appear, or may have more serious consequences, such as a financial computing system calculating the sale of stock incorrectly.

To resolve bit flip problems, previous solutions include using parity checking or Cyclic Redundancy Codes (CRC) to detect or correct errors. In particular, such solutions are applied to data in transit, such as when data travels from one computer to another computer via a network, or data at rest between non-processor components of a computer, such as when data is stored in memory. However, these solutions are insufficient to resolve bit flips that may occur within a processor during computations that occur within the processor.

SUMMARY

Embodiments of the present invention provide a method and a system of detecting bit errors in a multi-core processor, such that the multiple cores can be embodied as computing engines. When a subatomic particle, or other matter, impacts the processing cores of the processor, bit flips may occur. To detect these bit flips and thereby prevent erroneous results, operations performed by one core are inversely performed by another core. By comparing the results of the original operation and the inverse operation, embodiments of the invention can detect errors in binary data. If an error is detected, then the operations are performed again. In an alternative embodiment, multiple cores do not perform inverse operations, but instead perform identical operations in parallel. The results from the parallel operations are compared and if the results are not identical, then the operations are repeated.

It should be appreciated that the inverse operations methodology and the parallel operations methodology need not be mutually exclusive methods. These methods can be combined, as needed, in various embodiments to detect errors during multi-core processing. It will be obvious, however, to one skilled in the art, that embodiments of the present invention may be practiced without some or all of these specific details. In other instances, well known process operations have not been described in detail in order not to unnecessarily obscure the embodiments of the present invention described herein. Further, it should be appreciated that the present invention can be implemented in numerous ways, such as a process, an apparatus, a system, a device or a method on a computer readable medium. Several inventive embodiments of the present invention are described below.

Figure 1:
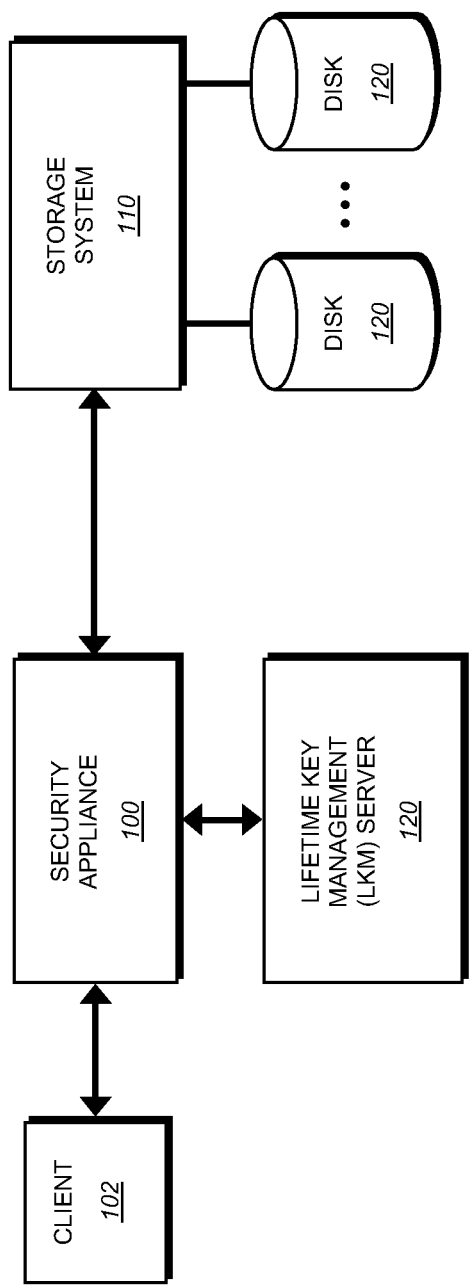
FIG. 1 is a schematic block diagram illustrating an environment including a multi-protocol security appliance, in accordance with an embodiment of the invention.

Other aspects of the invention will become apparent from the following detailed description taken in conjunction with the accompanying drawings, which illustrates by way of example, the principles of the invention.

DETAILED DESCRIPTION

The following embodiments describe a method and a system for detecting bit errors in a multi-core engine of a computing device, such as a computer. For example, a storage system is a computer that provides storage services relating to the organization of information on writable persistent storage devices, such as memories, tapes or disks, which hereinafter are referred to as storage media. A processor within the storage system may have multiple processing cores (multi-cores), also called multiple processing engines, such that the multiple cores can be embodied as computing engines. It should be appreciated that the processor can include two or more computing engines, as long as the computing engines are enabled to detect errors during processor computation. These multi-cores comprise for example, semiconductors, insulators, and the like, that are commonly found in conventional processors. However, it is contemplated that processors that use multiple processing engines, even if based on optical circuits, or some other technology, can use embodiments of the invention described herein.

When a subatomic particle, or other matter, impacts the processing cores during computation, bit flips may occur. Generally, the particles occur randomly and are transitory. Accordingly, an erroneous bit flip may occur during one computation, but may not occur during a subsequent, identical computation. To detect these bit flips and thereby prevent erroneous results from these randomly occurring particles, operations, or one or more computations, performed by one core are inversely performed by another core. By comparing the results of the original operation and the inverse operation, embodiments of the invention can detect errors in binary data. If an error is detected, then the operations are performed again. In an alternative embodiment, multiple cores do not perform inverse operations, but instead perform identical operations in parallel. The results from the parallel operations are compared and if the results are not identical, then the operations are repeated.

It should be appreciated that the inverse operations methodology and the parallel operations methodology need not be mutually exclusive methods. These methods can be combined, as needed, in various embodiments to detect errors during multi-core processing. It will be obvious, however, to one skilled in the art, that embodiments of the present invention may be practiced without some or all of these specific details. In other instances, well known process operations have not been described in detail in order not to unnecessarily obscure the embodiments of the present invention described herein.

Further, embodiments of the present invention can be practiced with any type of software application. Illustratively, exemplary applications may require highly reliable calculations, such as those used in military or security applications. Moreover, embodiments of the present invention shall also be described in the context of data encryption/decryption, although this description is merely illustrative.

In embodiments of the present invention, the storage system may be deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The storage system, illustratively embodied as a file server, or filer, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a communication network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement, or deployment, allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

Further, a network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

FIG. 1 is a schematic block diagram illustrating an environment including a multi-protocol security appliance, in accordance with an embodiment of the invention. The security appliance 100 is coupled between one or more clients 102 and one or more storage systems 110, such as an application server or storage system. However, it should be appreciated that in other embodiments of the present invention, the security appliance can be incorporated in the storage system, thus allowing the storage system to encrypt/decrypt data. It yet other embodiments, the security appliance may also be incorporated in a network device that routes data throughout a network; perhaps along with having the capability to provide storage services similar to the storage system. Accordingly, FIG. 1 should be understood to illustrate an example of an embodiment of the present invention. The security appliance 100, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 100 intercepts the request, encrypts the data associated with the request and forwards the encrypted data to the storage system 110 for storage at a specified location (address) on disk 120. In the case of a read request, the security appliance 100 intercepts the request and forwards it onto the storage system 110, which returns the requested data to the security appliance 100 in encrypted form. The security appliance 100 then decrypts the encrypted data and returns the decrypted data to the client 102.

In the illustrative embodiment, the security appliance 100 employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance 100 illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 100 uses an appropriate cryptainer key to encrypt or decrypt portions of data stored in a particular cryptainer. In addition to performing encryption and decryption operations, the security appliance 100 also performs access control, authentication, virtualization, and secure-logging operations.

A lifetime key management (LKM) server 120, or similar key management system, is configured to manage all encryption keys used by the security appliance 100 to encrypt and decrypt data securely stored on the storage system 110, ensuring encryption key availability for the life of the secured data. For example, the LKM server 120 receives encrypted cryptainer keys from the security appliance 100 and sends encrypted cryptainer keys on demand to the appliance. The LKM server 120 is further configured to support a plurality of security appliances 100 such that, when a particular appliance encounters a data access request directed to a cryptainer for which it does not have the appropriate key, that appliance accesses the LKM server 120 to receive the appropriate key. Embodiments of the present invention may be implemented on all computing devices of the environment illustrated by FIG. 1.

Figure 2:
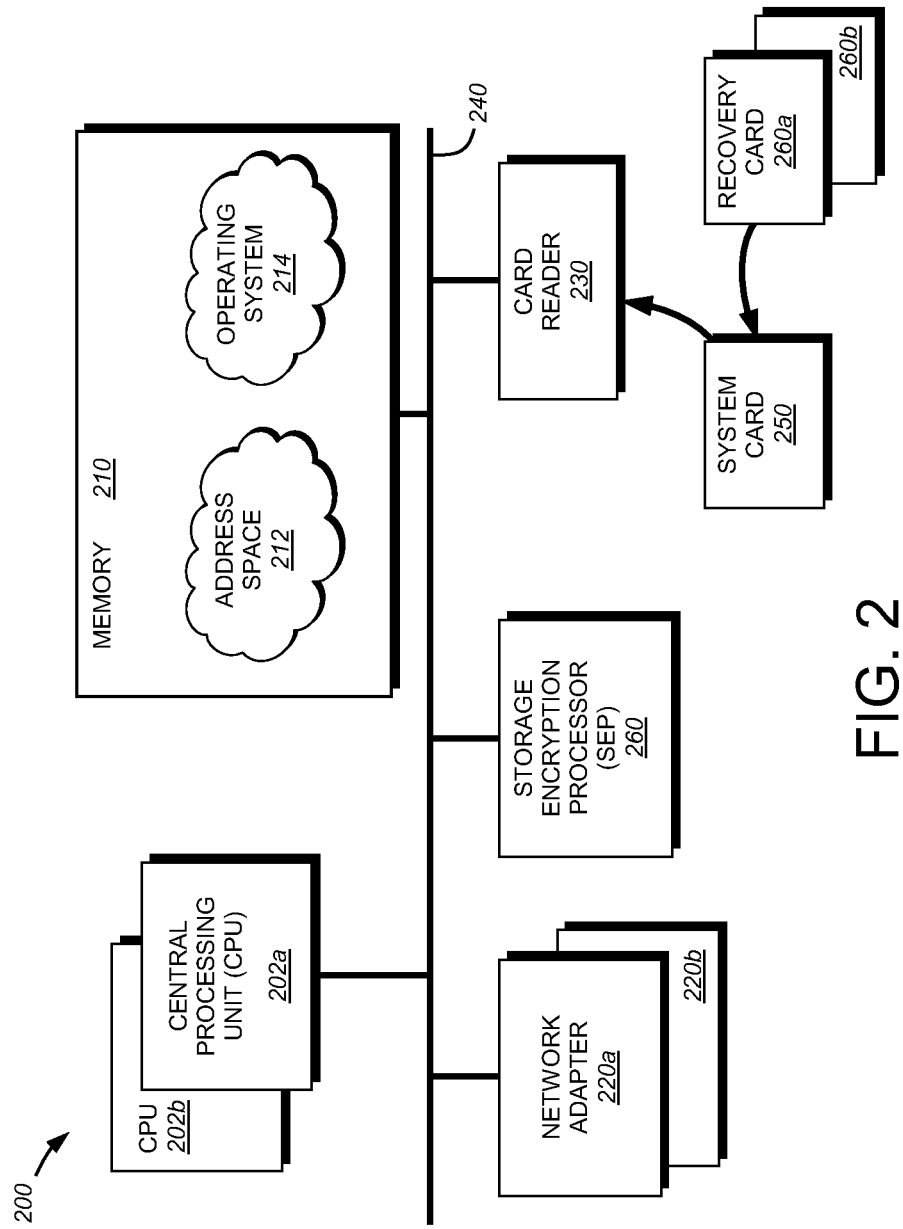
FIG. 2 is a schematic block diagram illustrating the multi-protocol security appliance, in accordance with an embodiment of the invention.

FIG. 2 is a schematic block diagram illustrating the multi-protocol security appliance 200, in accordance with an embodiment of the invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a multi-core storage encryption processor (SEP) 260 and a card reader 230 interconnected by a system bus 240, such as a conventional Peripheral Component Interconnect (PCI) bus. The SEP 260 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

Since the SEP 260 protects encryption keys from being "touched" (processed) by the system software executing on the CPU 202, a mechanism is needed to load keys into and retrieve keys from the SEP. To that end, the card reader 230 provides an interface between a "smart" system card 250 and the SEP 260 for purposes of exchanging encryption keys. Illustratively, the system card is a FIPS 140-2 level-3 certified card that is configured with customized software code. The security appliance (and card reader 230) are further configured to support additional smart cards referred to as recovery cards 260a,b. The security appliance illustratively supports up to 40 recovery cards with a default value of, e.g., 5 recovery cards, although any number of cards can be supported based on the particular security policy.

Operationally, encryption keys are exchanged between the SEP 260 and system card 250, where they are "secret shared" (cryptographically assigned) to the recovery cards 260 as recovery keys, as described herein. These recovery keys can thereafter be applied (via the recovery cards) to the security appliance 200 and/or LKM 120 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys.

In the illustrative embodiment, the threshold scheme of the recovery cards 260 is configured to split recovery policy keys that are based on various policies for recovery. For example, policy recovery keys may be split in a 2 out of 5 mechanism, whereby two policy keys are needed to encrypt domain keys which, in turn, encrypt the cryptainer keys. Therefore, a hierarchy of encryption keys is provided that generates a plurality (e.g., thousands) of cryptainer keys without the need for as many recovery policy keys ("secret shares"). Note that the secret shares are not stored as such on the recovery cards, but rather are encrypted with a key that is assigned to each of the recovery cards. Therefore, the secret shares are "cryptographically assigned" to the recovery cards 260.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS)

and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. For example, blocks of data may be stored in the memory 210 during read and write operations. The blocks may be, for example, in groups of 16 bytes. However, it should be appreciated that the block can be of any size that is adaptable for storage in the memory 210.

The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

The operating system 212 illustratively organizes the memory 210 into an address space arrangement available to the software processes and modules executing on the processors. In the illustrative embodiment, the operating system software is a customized version of a Unix type operating system, although other operating systems may be used.

Notably, the security appliance 200 "virtualizes" storage such that, to a client 102, the appliance appears as a storage system 110 whereas, from the perspective of the storage system, the security appliance appears as a client. Such virtualization requires that the security appliance manipulate network (e.g. IP or the like) addresses with respect to data access requests and responses. For example, the security appliance 200 manipulates (changes) the source and destination IP addresses of the data access requests and responses.

Figure 3:
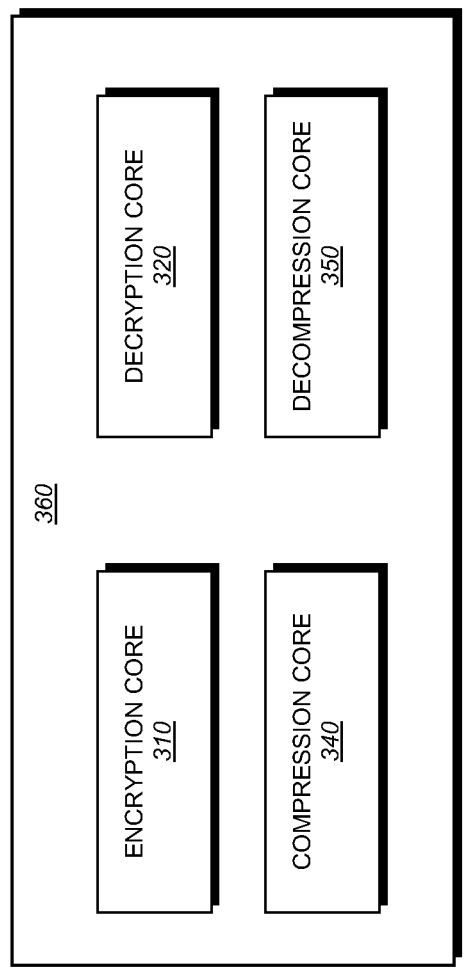
FIG. 3 is a schematic block diagram illustrating a security encryption processor of the multi-protocol security appliance, in accordance with an embodiment of the invention.

FIG. 3 is a schematic block diagram illustrating a multi-core security encryption (SEP) processor 360 of the multi-protocol security appliance, in accordance with an embodiment of the invention. Illustratively, four cores are shown having dedicated functions of encryption/decryption and compression decompression. However, it should be appreciated that the functions are purely exemplary and other types of functions are possible, as long as the functions permit using the teachings of the present invention. Further, the number of cores may not be even. For example, an odd number of cores, e.g. nine cores may be present, with only two cores performing functions such as encryption/decryption. Accordingly, the other seven cores can be configured to perform other operations.

The SEP 360 includes a (smart card) microcontroller (not shown) that comprises crypto engines configured to perform, inter alia, key management using an internal program code base with a field programmable gate array FPGA (not shown). It should be appreciated that an FPGA is purely illustrative. For example, the logic implemented by the FPGA may be embodied in an Application Specific Integrated Circuit (ASIC), or the like, in a secure software environment, software/hardware combination, etc.

The microcontroller communicates with logic circuitry embodied as the FPGA configured to perform encryption and decryption operations for the SEP. Specifically, the FPGA can be configured to include multiple processing cores such an encryption core 310, a decryption core 320, a compression core 340, and a decompression core 350. In other embodiments, the compression core 340 and the decompression core 350 need not be implemented. Thus, FIG. 3 is illustrative of an example of multiple processing cores, as contemplated by embodiments of the present invention.

The encryption core 310 performs encryption of blocks of data while in contrast, an "inverse" operation to decrypt blocks of data is performed by the decryption core 320. Similarly, the compression core 340 compresses blocks of data, while the "inverse" operation to decompress blocks of data is performed by the decompression core 350. It should be appreciated that the cores described above to perform inverse operations are purely illustrative of "complementary" computations and in other embodiments of the present invention described further below, such as those with respect to FIG. 7, the cores can perform parallel operations using "redundant" computations.

Further, the FPGA includes an input/output (I/O) unit (not shown) coupled to at least one key unit (not shown) that contains state models used by the SEP 360 to process keys for encryption/decryption. For example, the microcontroller transmits keys to the FPGA. Thereafter, the FPGA initiates DMA operations over the system bus 240 to retrieve data stored in memory 210 and provide that data to at least one key unit for encryption/decryption. The FPGA then initiates DMA operations to return the data (with descriptor handling) over the bus 240. It should be appreciated that a key unit per encryption core 310 and decryption core 320 are included in exemplary embodiments of the present invention. In yet other embodiments, a single key unit may be used to globally implement state models for encryption/decryption.

Figure 4:
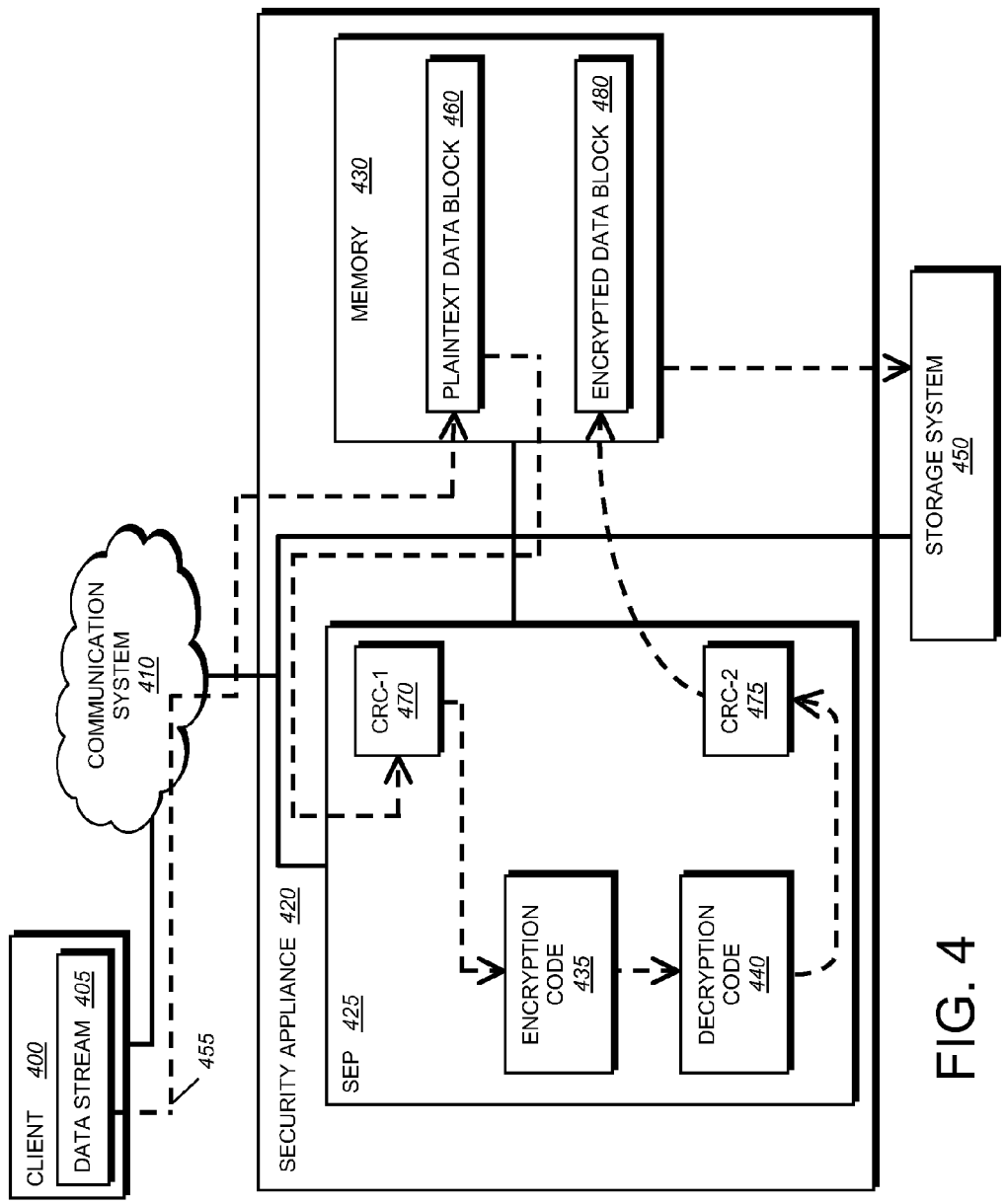
FIG. 4 is an illustration depicting the writing of a data stream to a storage system while detecting processor core errors, in accordance with an embodiment of the invention.

FIG. 4 is an illustration depicting the writing of a data stream 405 to a storage system 450 while detecting processor core errors, in accordance with an embodiment of the invention. Although the illustrated embodiment is described for a write operation, it should be appreciated that a read operation is performed in a similar way. Specifically, a client 400 can generate the data stream 405 to the storage system 450 to perform a data access request, such as a read or write operation. An intermediary device, such as a security appliance 420, includes a processor configured to detect bit errors that occur during the processing of the data access request.

In an exemplary embodiment of the present invention, the client 400 transmits the data stream 405 via a path 455 through a communication system 410 to the security appliance 420 to perform the write operation to the storage system 450. Specifically, the data stream 405 includes plaintext data, or unencrypted data. The unencrypted data may be encrypted by an encryption processor and subsequently stored on storage media (not shown) managed by the storage system 450. In an exemplary embodiment of the present invention, included within the security appliance 420 is a security encryption processor 425 and a memory 430. The memory 430 further includes registers, or buffers, to store data, such as plaintext data block 460 and an encrypted data block 480. The plaintext data block 460 stores unencrypted portions of the data stream 405 before encrypting data. The encrypted data block 480 stores the encrypted portions of the data stream 405 after encrypting data.

The storage encryption processor 425 includes multiple cores, such as encryption core 435, a decryption core 440, and buffers to store data. Illustratively, the data stored in the buffers CRC-1 470 and CRC-2 475, may be parity "fingerprint" information (i.e. a "signature," unique identifier), such as cyclic redundancy codes (CRC), a hash function computation (e.g. Secure Hash Algorithm; SHA-1), a linear feedback shift register computation, or the like. Thus, CRC-1 470 and CRC-2 475 are first and second buffers, respectively, that identify memory locations for storing the fingerprint. It should be appreciated that the buffers, although illustrated in the memory 430 and the storage encryption processor 425, other components of the security appliance 420 can have buffers for storing the data described herein.

When processing the unencrypted data stored in the plaintext data block 460, the storage encryption processor 425 calculates fingerprint information for the unencrypted data and stores the fingerprint information in CRC-1 470. Thereafter, the encryption core 435 processes the unencrypted data and produces encrypted data. Subsequently, the encrypted data is processed by the decryption core 440, which produces unencrypted data. Once more, the storage encryption processor 425 calculates fingerprint information for the unencrypted data and stores the result in CRC-2 475.

Before transmitting the encrypted data from the storage encryption processor 425 to the memory 430 for storage in the encrypted data block 480, the fingerprint information from CRC-1 470 and CRC-2 480 are compared. If the fingerprint information is a match, then the encrypted data is transmitted to the memory 430. However, if the fingerprint information does not match, then the encryption and decryption operations are performed again. Thus, by performing both an encryption and decryption operation on the data, any erroneous data can be detected before storing the encrypted results on the storage system 450 because errors during the encryption or decryption operations will produce different fingerprint information.

Figure 5A:
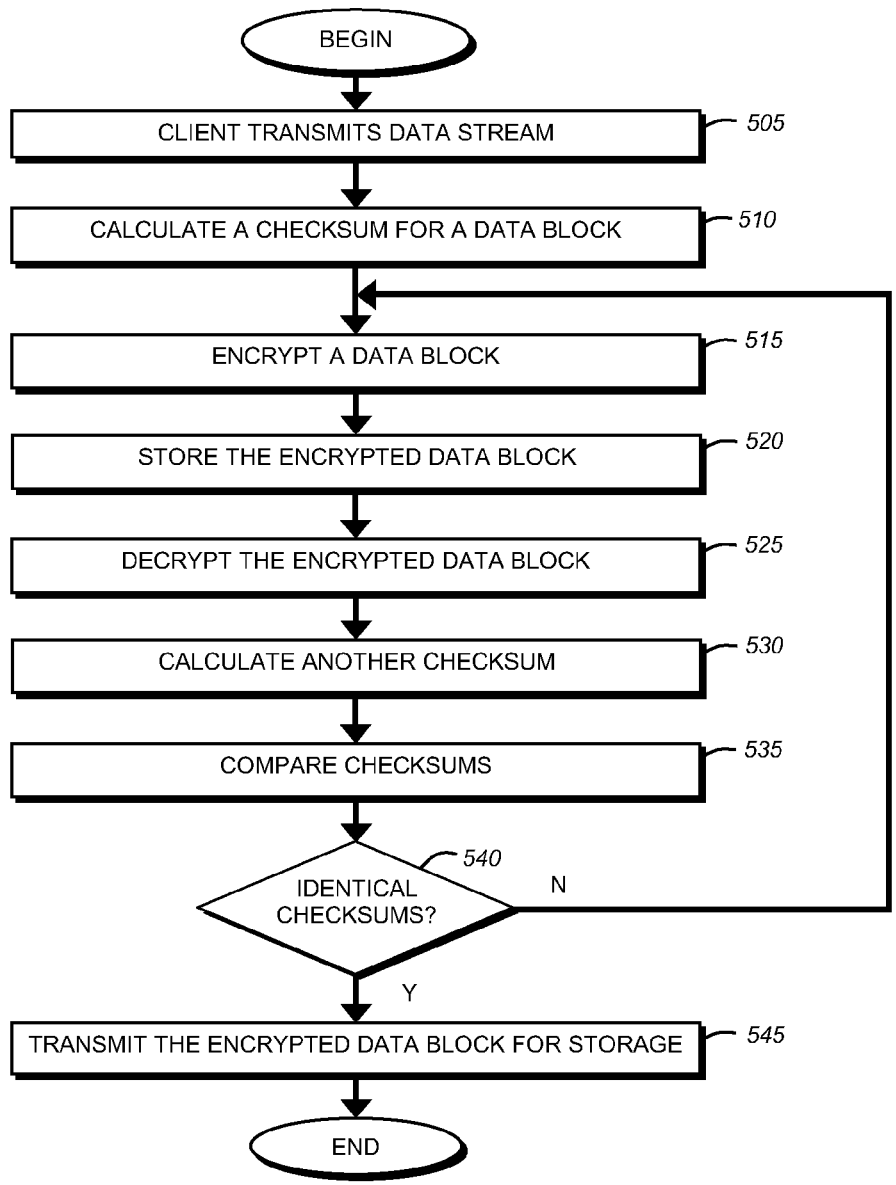
FIG. 5A is a flowchart diagram of operations for performing a write operation to encrypt data, in accordance with an embodiment of the invention.

FIG. 5A is a flowchart diagram of operations for performing a write operation to encrypt data, in accordance with an embodiment of the invention. It should be appreciated that the methodology described herein for encrypting/decrypting data to perform a write operation is applicable to other operations where data is not encrypted. For example, if a processor includes a first processor core to convert a black-and-white image to a white-and-black image, then the inverse process performed by a second processor core is to convert the white-and-black image to a black-and-white image. Thus, descriptions and details regarding the use of multiple cores for encryption are purely illustrative. The operations for performing the write operation, as described above with respect to FIG. 4 can begin with operation 505 wherein the client transmits a data stream.

The data stream includes unencrypted data, which will be written in encrypted form by a storage system. The data stream is transmitted to a security appliance, which uses and encryption processor with multiple cores to encrypt the unencrypted data. To prevent erroneous processing within the encryption processor, an operating system of the security appliance initiates the calculation of checksum for a data block in operation 510. Thereafter, in operation 515, and encryption core of the encryption processor encrypts the data block, which includes unencrypted data. It should be appreciated that the data block includes multiple data patterns of binary-represented data. However, other embodiments can represent data in any format, as long as the groupings of the data patterns occur in blocks. In operation 520, the encrypted data block is stored in a buffer of the encryption processor (not shown in FIG. 4). Subsequently, in operation 525, the decryption core of the encryption processor decrypts the encrypted data block. In operation 530, the operating system of the security appliance calculates another checksum from the decrypted data block. It should be appreciated that if no errors occur during the encryption and decryption operations, both checksums should match and have identical values. Consequently, the operating system of the security appliance compares the checksums in operation 535. If the checksums are identical in operation 540, then in operation 545 the encryption processor transmits the encrypted data block for storage. Alternatively, in operation 540, if checksums are not identical, then the method proceeds to operation 515 to start the encryption and decryption operations again.

Figure 5B:
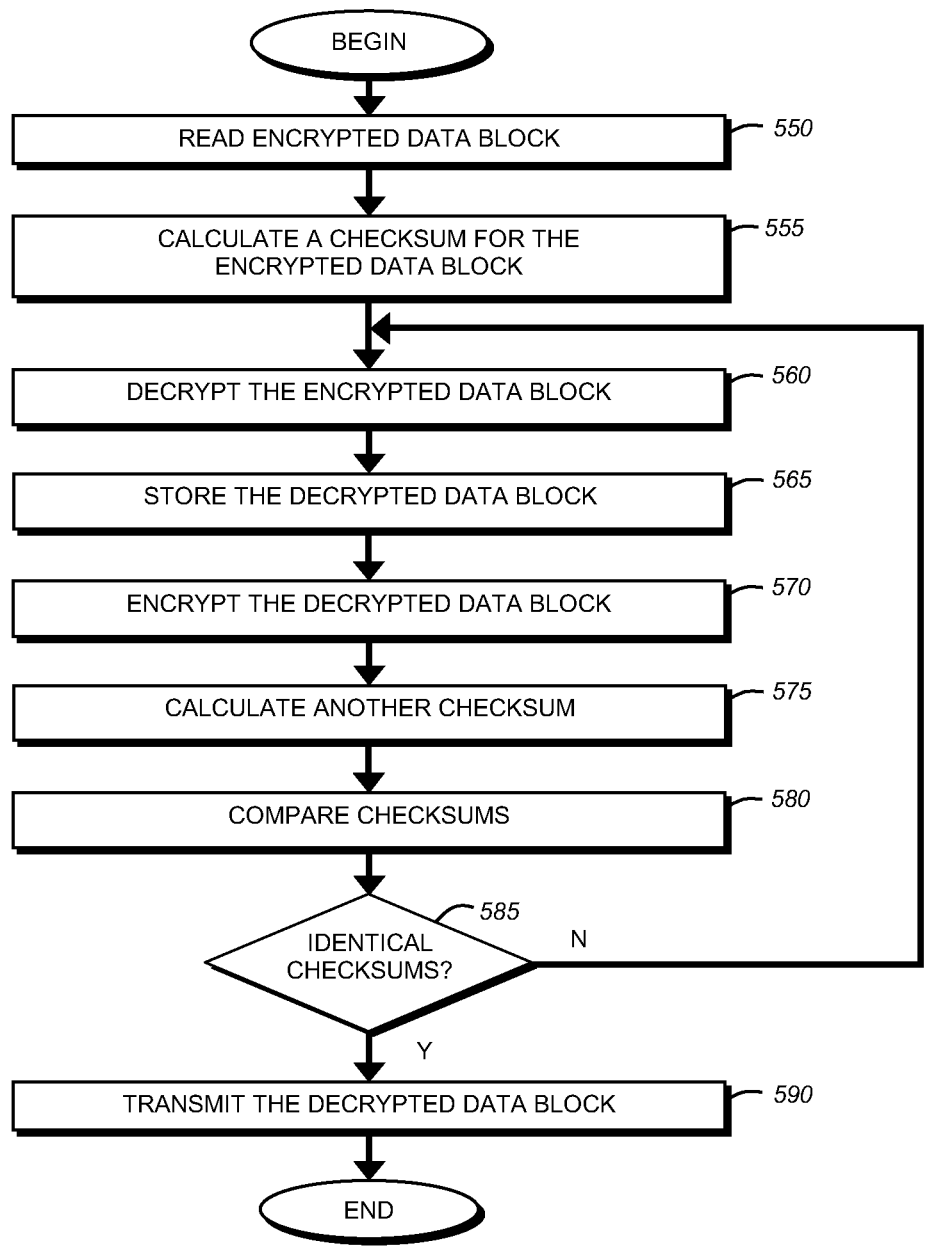
FIG. 5B is a flowchart diagram of operations for performing a read operation of encrypted data, in accordance with an embodiment of the invention.

FIG. 5B is a flowchart diagram of operations for performing a read operation of encrypted data, in accordance with an embodiment of the invention. Specifically, in operation 550 a client initiates a data access request to read an encrypted data block previously stored by storage system. When the security appliance receives the request, the security appliance obtains the encrypted data block from the storage system. The operating system of the security appliance then calculates a checksum for the encrypted data block in operation 555. Thereafter, in operation 560, the decryption core of the encryption processor decrypts the encrypted data block. The decrypted data block is subsequently stored in a buffer (not shown) of the encryption processor in operation 565. Thereafter, in operation 570, the encryption core of the encryption processor encrypts the decrypted data block. The operating system of the security appliance once again calculates another checksum in operation 575 for the decrypted data block. In operation 580, the operating system of the security appliance compares the checksums. If the checksums are identical in operation 585, then the next operation 590 results in the transmission of the decrypted data block to the client that initially made the data access request. However, in operation 585, if the checksums are not identical, then the next operation 560 restarts the decryption and encryption operations.

Figure 6A:
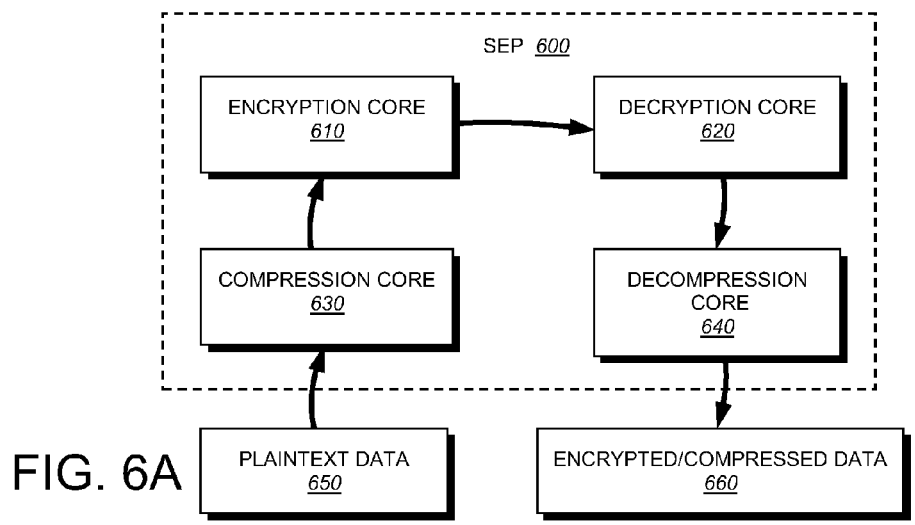
FIG. 6A is a schematic block diagram illustrating the performance of a compression and encryption process, in accordance with an embodiment of the invention.

FIG. 6A is a schematic block diagram illustrating the performance of a compression and encryption process, in accordance with an embodiment of the invention. In another embodiment of the present invention, a storage encryption processor (SEP) 600, includes an encryption core 610, a decryption core 620, a compression core 630, and a decompression core 640. In this exemplary embodiment, the encryption and decryption operations are inverse operations and compression and decompression operations are inverse operations. For example, plaintext data 650 can be received by the processor 600 where the plaintext data 650 is compressed. Various compression and decompression algorithms can be used, such as using Lempel-Ziv-Welch (LZW) compression. It should be appreciated that any compression/decompression algorithm can be used in embodiments of the invention.

After compressing the plaintext data 650, the processor 600 encrypts the compressed data by using the encryption core 610. The encrypted data is subsequently decrypted by the decryption core 620, which is then subsequently decompressed by the decompression core 640 to produce the plaintext data 650. If two checksums are calculated, where the first checksum is calculated before compression and second checksum is calculated after decompression, then a match of the checksums will indicate no error occurred during processing by the cores.

In yet another embodiment, more than two checksums can be calculated. For example, in addition to the previous checksums described, a third checksum can be calculated prior to encryption, and a fourth checksum can be calculated prior to decompression. If the third and fourth checksums are identical, then there were no errors during the encryption and decryption operations. Otherwise, any differences in the pairs of checksum will indicate errors that occurred either during compression and decompression or encryption and decryption. If there are no errors detected because the pairs of checksums were identical, i.e. the first checksum value was identical to the second checksum value and the third checksum value was identical to the fourth checksum value, then the encrypted/compressed data 660 can be written to storage media.

Figure 6B:
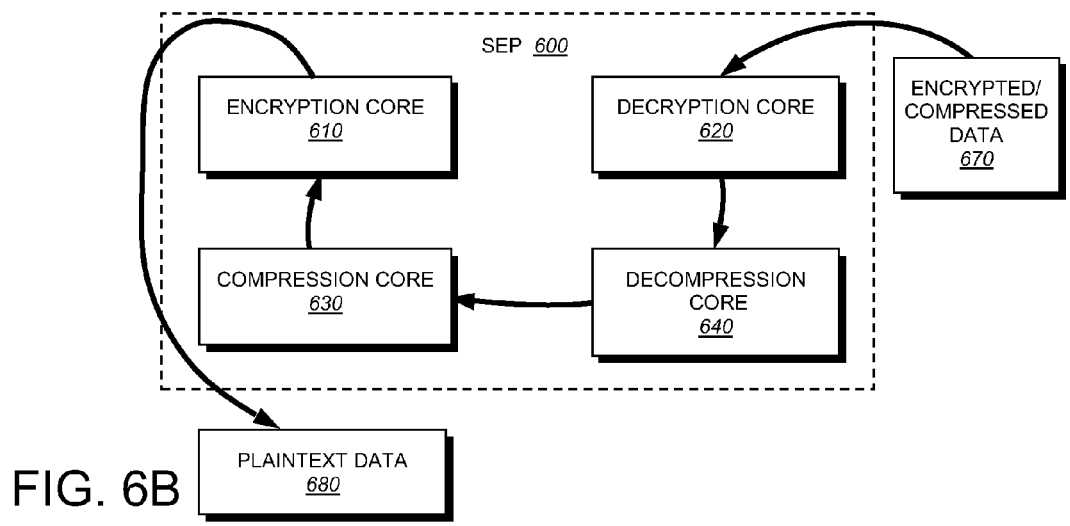
FIG. 6B is a schematic block diagram illustrating the performance of a decompression and decryption process, in accordance with an embodiment of the invention.

FIG. 6B is a schematic block diagram illustrating the performance of a decompression and decryption process, in accordance with an embodiment of the invention. To perform a reverse process described in FIG. 6A, the encrypted/compressed data 670 is operated upon by the processor using the multiple cores. Specifically, the decryption core 620 decrypts the encrypted/compressed data 670 and decompresses the decrypted data using the decompression core 640. Thereafter, the operations are inverted and the decompressed data is compressed by the compression core 630. Subsequently, the compressed data is encrypted by the encryption core 610. If checksums are calculated prior to decryption and after encryption, then errors can be detected by comparing the checksums. In yet another embodiment, additional checksums can be calculated before decompression and after compression to determine whether errors occurred during the decompression and compression operations. If no errors are detected, then the plaintext data 680 is transmitted to the client that initiated the data access request.

Figure 7:
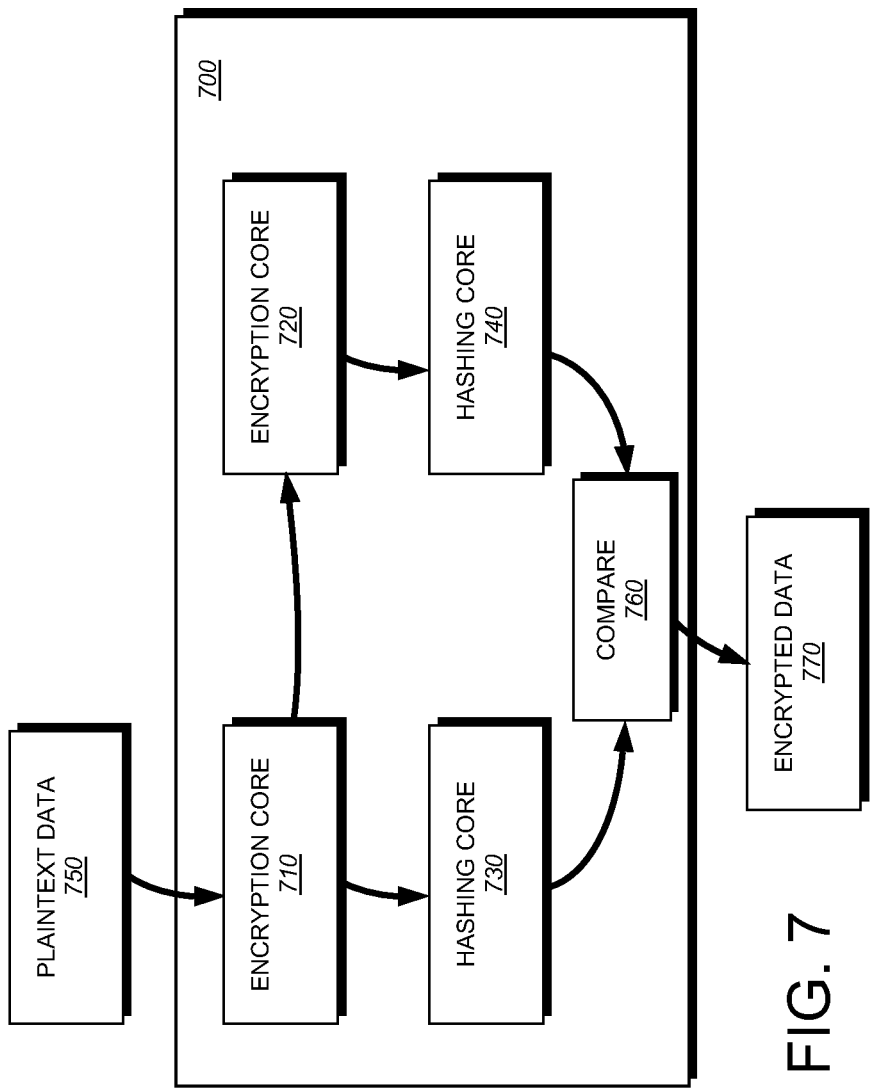
FIG. 7 is a schematic block diagram illustrating the performance of a parallel encryption process, in accordance with an embodiment.

FIG. 7 is a schematic block diagram illustrating the performance of a parallel encryption process, in accordance with an embodiment. In the parallel encryption process performed by the processor 700, the plaintext data 750 is encrypted by the encryption core 710 and also by the encryption core 720. The results of both encryption operations are operated upon by the hashing core 730 and the hashing core 740 in parallel. Computations performed in parallel means that processing by the encryption core 710 in the hashing core 730 occur independently from the processing by the encryption core 720 in the hashing core 740. Thereafter, in buffer 760, the results from the hashing cores are compared to determine if they are identical. If they resulting values are identical, then the encrypted data 770 is transmitted to the storage system. In yet another embodiment (not shown), the parallel encryption process can be combined with compression and decompression cores using checksums to detect errors. Moreover, other embodiments may not employ hashing techniques. Instead data, or some other fingerprint of the data can be compared. For example, in other embodiments, it may be more efficient to perform comparisons on atomic units of data than performing the hash or computing a fingerprint, as long as multiple cores are used to detect errors during processor computation.

In other embodiments of the present invention, it should be also appreciated that the cores may be general purpose cores that are designated by an operating system or process to perform particular computations, whether inverse computations or parallel computations. Further, the cores may be enabled or disabled for detecting errors during processor computation. Thus, by enabling/disabling error detection during processor computation, processor computation speed may be increased.

The operations described above are purely exemplary and imply no particular order. For example, the operations may be used in a modified sequence or may be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations that may be implemented by a machine. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), Storage Area Network (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in Linux® compute farms.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system for detecting errors during processing, comprising:
   a network adapter of the computer system configured to receive a data stream including data from a client; and
   a processor of the computer system configured to process the data, the processor including one or more processor cores, wherein the one or more processor cores includes at least one of an encryption core and a decryption core, the one or more processor cores further configured to:
   calculate a first signature associated with the data,
   perform a first operation to the data to produce first updated data,
   perform a second operation to the first updated data to produce second updated data,
   calculate a second signature associated with the second updated data,
   store the first signature and the second signature in at least one buffer of the computer system;
   compare the first signature and the second signature from the at least one buffer,
   in response to the first signature and the second signature matching, store the first updated data in a memory of the computer system, and
   in response to the first signature and the second signature not matching: (i) perform the first operation to the data to produce new first updated data, (ii) perform the second operation to the new first updated data to produce new second updated data, and (iii) calculate a new second signature associated with the new second updated data, wherein (i)-(iii) are performed until the first signature associated with the data matches the new second signature.

2. The computer system of claim 1, wherein the first operation comprises compression, and the second operation comprises decompression.

3. The computer system of claim 1, wherein the one or more processor cores are the same.

4. The computer system of claim 3, wherein the first signature comprises one of parity information, a cyclic redundancy code, a hash function computation, and a linear feedback shift register computation.

5. The computer system of claim 1, wherein the first signature is calculated before the first operation is performed and the second operation is performed after the second signature is calculated.

6. The computer system of claim 1, wherein the first operation is performed after the first signature is calculated and the second operation is performed before the second signature is calculated.

7. The computer system of claim 1, wherein the first operation comprises encryption and the second operation comprises decryption.

8. The computer system of claim 1, wherein the first operation and the second operation are performed in parallel.

9. The computer system of claim 1, wherein the first operation is an inverse operation to the second operation.

10. The computer system of claim 1, wherein the data is stored on a storage device operatively connected to the computer system if the first signature and the second signature match.

11. The computer system of claim 1, wherein a match between the first signature and the second signature indicates an absence of an error.

12. The computer system of claim 1, wherein at least one of the one or more processor cores comprises a field programmable gate array.

13. The computer system of claim 1, wherein the processor further includes the at least one buffer.

14. A method, comprising:
    receiving, at a network adapter, a data stream including data from a client;
    processing the data by a computer processor having one or more processor cores that includes at least one of an encryption core and a decryption core, the one or more processor cores configured for:
    calculating a first signature associated with the data;
    performing a first operation to the data to produce first updated data;
    performing a second operation to the first updated data to produce second updated data;
    calculating a second signature associated with the second data;
    storing the first signature and the second signature in at least one buffer;
    comparing the first signature and the second signature from the at least one buffer;
    storing the first updated data in a memory coupled to the computer processor in response to the first signature and the second signature matching; and
    in response to the first signature and the second signature not matching: (i) performing the first operation to the data to produce new first updated data, (ii) performing the second operation to the new first updated data to produce new second updated data, and (iii) calculating a new second signature associated with the new second updated data, wherein (i)-(iii) are performed until the first signature associated with the data matches the new second signature.

15. The method of claim 14, wherein the first operation comprises compression, and the second operation comprises decompression.

16. The method of claim 14, wherein a first processor core and a second processor core are the same.

17. The method of claim 14, wherein the first signature comprises a fingerprint.

18. The method of claim 14, further comprising:
    performing the first operation before calculating the first signature; and
    performing the second operation after calculating the second signature.

19. The method of claim 14, further comprising:
    performing the first operation after calculating the first signature; and
    performing the second operation before calculating the second signature.

20. The method of claim 14, wherein the first operation comprises encryption and the second operation comprises decryption.

21. The method of claim 14, further comprising performing the first operation and the second operation in parallel.

22. The method of claim 14, wherein the first operation is an inverse operation to the second operation.

23. The method of claim 14, further comprising:
    performing the first operation by a first processor core of the one or more processor cores; and
    performing the second operation by a second processor core of the one or more processor cores.

24. The method of claim 14, further comprising performing the first operation and the second operation on the data a second time in response to detecting an error.

25. The method of claim 14, further comprising detecting an error in response to not a match between the first signature and the second signature.

26. The method of claim 14, wherein at least one of the one or more processor cores comprises an application specific integrated circuit.

27. A non-transitory computer readable medium containing executable program instructions to be executed by a processor, the computer readable medium comprising:
    program instructions that receive a data stream including data from a client;
    program instructions that process the data by a processor including one or more processor cores that includes at least one of an encryption core and a decryption core;
    program instructions that produce a first signature associated with the data by a first processor core of the one or more processor cores;
    program instructions that perform a first operation to the data to produce first updated data;
    program instructions that perform a second operation to the first updated data to produce second updated data;
    program instructions that produce a second signature associated with the second updated data by a second processor core of the one or more processor cores;
    program instructions that store the first signature and the second signature in at least one buffer;
    program instructions that compare, from the at least one buffer, the first signature and the second signature to detect whether a bit flip error associated with the data occurred when performing the first operation or the second operation, wherein the bit flip error occurs if the first signature and the second signature do not match;
    program instructions that transmit the data to a location to be stored in response to the detecting that the bit flip error has not occurred; and program instructions that, in response to the detecting that the bit flip error has occurred: (i) perform the first operation to the data to produce new first updated data, (ii) perform the second operation to the new first updated data to produce new second updated data, and (iii) produce a new second signature associated with the new second updated data, wherein (i)-(iii) are repeated until the first signature matches the new second signature.

28. A system to detect errors during data processing, comprising:
  a network adapter of the computer system configured to receive a data stream including a plurality of data blocks from a client; and
  a processor of the computing system configured to process the plurality of data blocks, the processor including one or more processor cores that includes at least one of an encryption core and a decryption core;
  at least one of the one or more processor cores configured to perform a first operation on a first block of the plurality of blocks to produce a first signature;
  at least one of the one or more processor cores configured to perform a first function on the first data block to produce a second data block;
  at least one of the one or more processor cores configured to perform a second function on the second data block to produce a third data block;
  at least one of the one or more processor cores configured to perform a second operation on the third data block to produce a second signature;
  a buffer configured to store the first signature and the second signature;
  at least one of the one or more processor cores configured to compare the first signature and the second signature from the buffer to determine an occurrence of a bit flip error associated with the first data block that occurs when performing the first operation or the second operation, wherein the bit flip error occurs if the first signature and the second signature do not match; and
  a memory configured to store the first signature and the second signature in response to the first signature and the second signature matching;
  at least one of the one or more processor cores, in response to the first signature and the second signature not matching, configured to: (i) perform the first function on the first data block to produce a new second data block, (ii) perform the second function on the new second data block to produce a new third data block, and (iii) perform the second operation on the new third data block to produce a new second signature, wherein (i)-(iii) are repeated until the first signature matches the new second signature.

29. The system of claim 28, wherein the at least one of the one or more processor cores that performs the first function and the at least one of the one or more processor cores that perform the second function are the same.

* * * * *